US 6,375,248 B1

(12) United States Patent
Bergström

(10) Patent No.: US 6,375,248 B1
(45) Date of Patent: Apr. 23, 2002

(54) COVER FOR A VEHICLE

(75) Inventor: Åke Bergström, Mariefred (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/622,805
(22) PCT Filed: Nov. 30, 1999
(86) PCT No.: PCT/SE99/02223
§ 371 Date: Aug. 22, 2000
§ 102(e) Date: Aug. 22, 2000
(87) PCT Pub. No.: WO00/38940
PCT Pub. Date: Jul. 6, 2000

(30) Foreign Application Priority Data

Dec. 23, 1998 (SE) ............................................. 9804524

(51) Int. Cl.$^7$ ................................................ B60J 7/00
(52) U.S. Cl. ............. 296/138; 296/100.15; 296/100.16; 296/181; 296/183
(58) Field of Search ....................... 256/180.15, 180.16, 256/181, 183, 138

(56) References Cited

U.S. PATENT DOCUMENTS

| 3,709,552 A | * | 1/1973 | Broadbent ................... 296/155 |
| 4,408,793 A | * | 10/1983 | Broadbent ................... 296/181 |
| 4,545,611 A | * | 10/1985 | Broadbent ................... 296/183 |
| 4,595,231 A | * | 6/1986 | Bennett et al. ............. 296/181 |
| 4,671,562 A | * | 6/1987 | Broadbent ................... 296/181 |
| 4,762,361 A | * | 8/1988 | Horton et al. .............. 296/181 |
| 4,795,208 A | * | 1/1989 | Whiteman ................... 296/181 |
| 4,826,236 A | * | 5/1989 | Bennett ....................... 296/181 |
| 4,828,316 A | * | 5/1989 | Bennett et al. ............. 296/181 |
| 4,952,009 A | * | 8/1990 | Mountz et al. ............. 296/181 |
| 5,176,388 A | * | 1/1993 | Horton ........................ 296/181 |
| 5,215,349 A | * | 6/1993 | Horton ........................ 296/181 |
| 5,607,200 A | * | 3/1997 | Smidler ....................... 296/181 |

FOREIGN PATENT DOCUMENTS

| DE | 3345970 | 6/1985 |
| EP | 131706 | 1/1985 |
| EP | 569039 | 11/1993 |
| GB | 20123 466 A | * 7/1982 |
| GB | 2 174 136 A | * 4/1985 |

* cited by examiner

Primary Examiner—Joseph D. Pape
Assistant Examiner—Kiran B. Patel
(74) Attorney, Agent, or Firm—Ostrolenk, Faber, Gerb & Soffen, LLP

(57) ABSTRACT

A side curtain for the superstructure of a freight vehicle has its upper edge arranged for longitudinal movement at an upper portion of the superstructure. The bottom edge of the curtain includes a relatively rigid engaging device which extends along substantially the whole length of the curtain, is releasably connectable to a tensioning device. The engaging device has evenly spaced bending notches which, when the engaging device is at least partially freed from the tensioning device, guides the folding of the curtain during movement of its upper edge towards a non-covering position.

28 Claims, 10 Drawing Sheets

COVER FOR A VEHICLE

TECHNICAL FIELD

The present invention relates to a vehicle side curtain, and more particularly, to devices for tensioning the curtain and enabling it to be conveniently folded.

STATE OF THE ART

A well-known problem with traditional freight vehicle side curtains is that it takes a considerable time to fasten at separate points along the vehicle a multiplicity of hooks or straps connected to the curtain. In the case of straps which are not elastic, the curtain has also to be tightened separately at each fastening point.

EP-A-0 569 039 discloses a tightenable curtain for the side of a freight vehicle. The curtain extends from the top of the vehicle superstructure to the bottom thereof. The curtain is tensioned by attachments of the bottom of the curtain at a plurality of locations along the curtain to a tensioning device. The EP publication describes a vehicle side curtain arrangement which solves the problem of separate tightening at each fastening point by use of a spindle which extends along the side of a vehicle and in which the curtain is fastenable. The curtain is provided with a multiplicity of elastic straps with hooks which engage with corresponding recesses on the spindle. Rotation of the spindle stretches the straps and hence the curtain. It nevertheless remains necessary to carry out manually the most time-consuming stage, namely the individual engagement of each strap with the spindle.

DESCRIPTION OF THE INVENTION

The object of the invention is to provide, starting from the state of the art according to EP 0 569 039, an improved vehicle side curtain arrangement which allows further simplification and rationalisation of the handling of side curtains on freight vehicles. It is in particular intended to reduce manual handling to a minimum. In addition, the curtain has to be capable of being easily and quickly opened completely or partially in order to provide access to larger or smaller portions of the cargo space inside the curtain, and in more or less open states the curtain should not allow personnel carrying out loading or unloading to be subject to inconvenience or risk of injury through the possibility of the curtain flapping violently because of wind. Finally, the curtain has to be lockable to prevent improper access to cargo.

This is achieved by the invention which enables tensioning of a side curtain or releasing of tension and enables the curtain to be folded to open the side of the vehicle. The curtain is fastened at several fastening points to the tensioning element. An engaging device on the curtain engages the tensioning element and that engaging device has spaced fold permitting locations in the form of notches of reduced cross-section.

The result is greater or lesser access to the cargo space along a vertical demarcation, i.e. the more or less open curtain; this is unlike the opening of traditional freight vehicle side curtains, which at least when partially open provide an approximately triangular aperture and also require the relevant portion of the curtain to be held open with one hand. Uniform distribution of tensioning forces is also achieved.

Bending or folding notches which the folding length are provided in the engaging device, which has a circular cylinder cross-sectional shape.

An advantageous way of connecting the engaging device to the curtain is a channel at the bottom of the curtain receiving the engaging device.

To make it possible to move the curtain along the tensioning device without the curtain losing its engagement with the latter, the tensioning device has a recess for the engaging device with a restricted size opening.

To make it possible to release the curtain from the tensioning device at a specific point, two of the metal sections of the tensioning device are arranged at a large enough mutual spacing.

DESCRIPTION OF DRAWINGS

An embodiment of the invention is described below with reference to the attached drawings, in which.

DESCRIPTION OF AN EMBODIMENT

Figure 1:
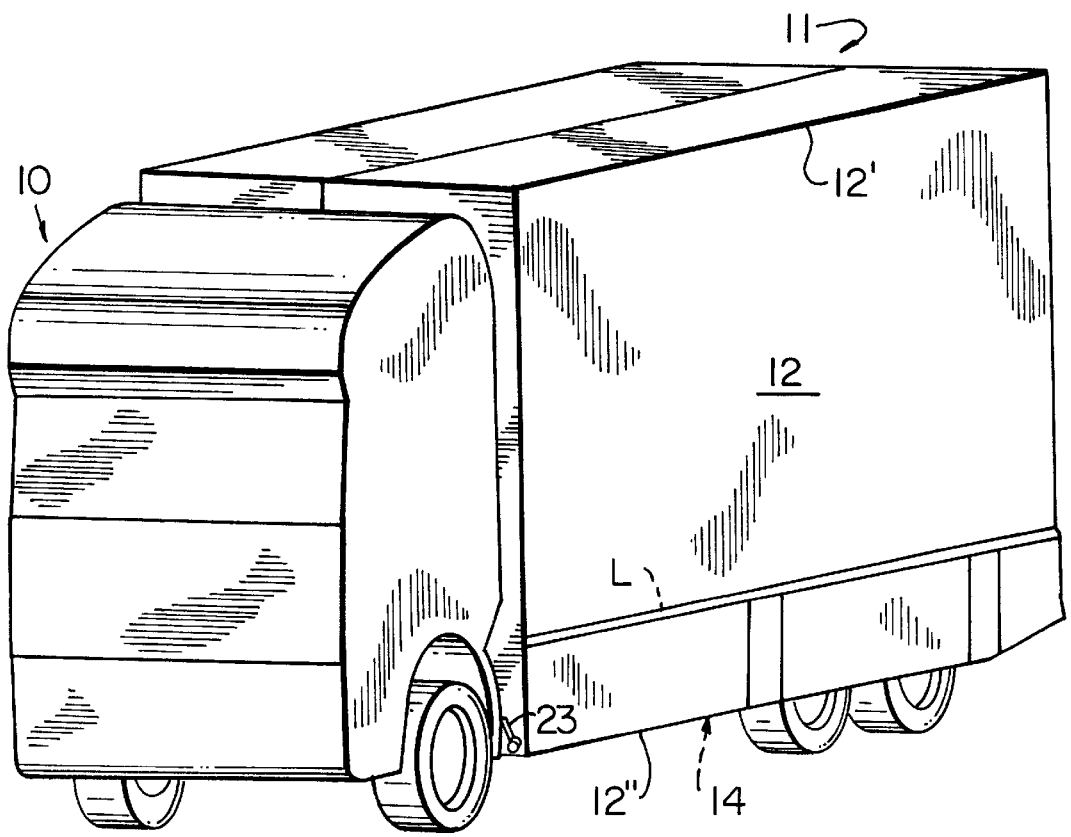
FIG. 1 depicts in perspective a freight vehicle with side vehicle side curtain according to the invention.
Figure 2:
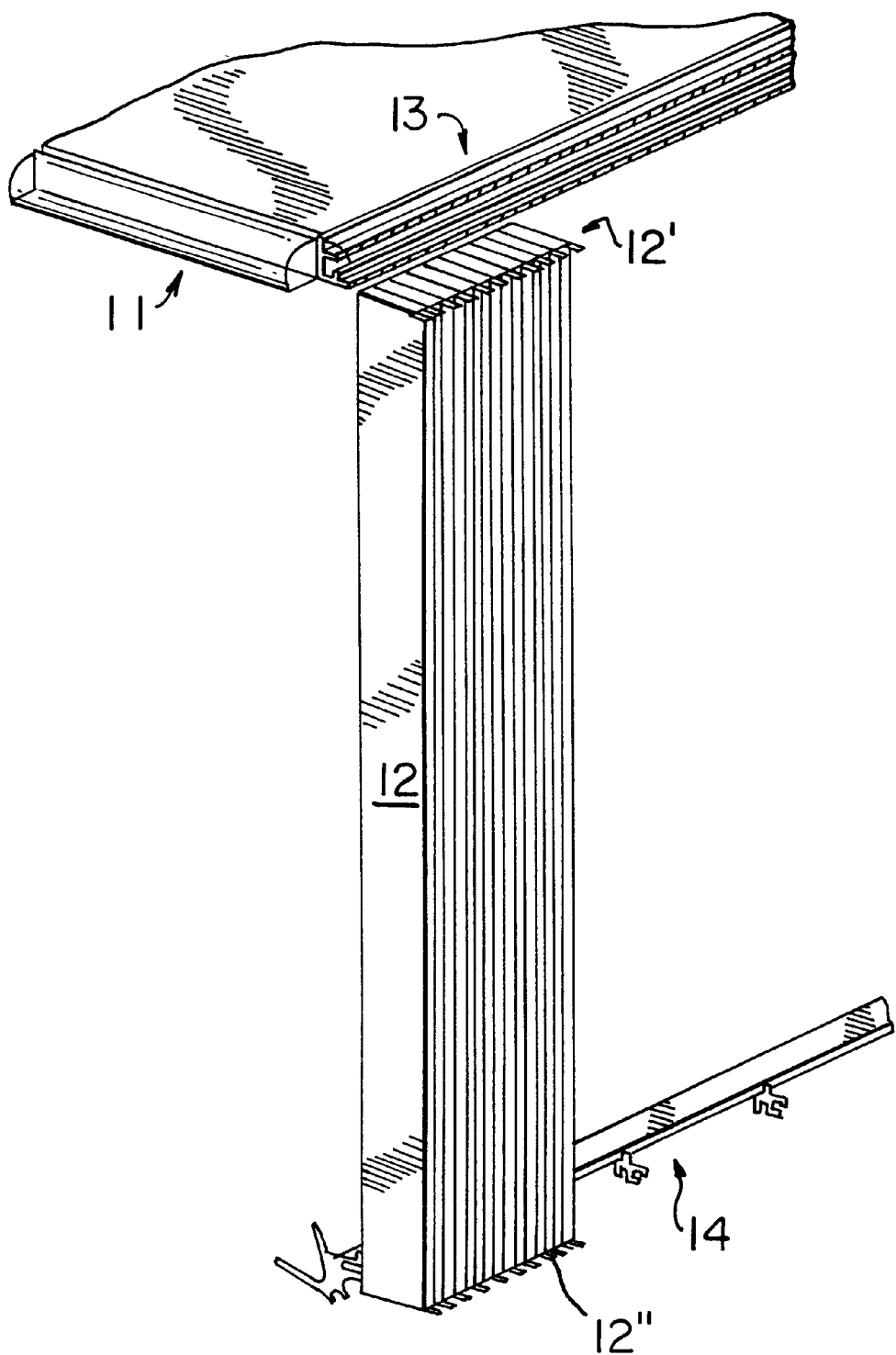
FIG. 2 depicts in perspective a forward portion of the left half of the vehicle's superstructure with a side curtain according to the invention.

FIG. 1 depicts a freight vehicle 10 with a superstructure 11 which on at least the depicted left side of the vehicle is provided with a side curtain 12 according to the invention, which curtain is shown completely closed. The curtain extends down from an upper portion 11' of the superstructure 11, more specifically from a longitudinal member 13 depicted in FIG. 2, to a lower level which at least corresponds to the lowest level L of the vehicle's cargo space CS. In FIG. 2, the vehicle is shown to be provided with an underrun bar 14 extending in a conventional manner rearwards from the front wheel to prevent any other vehicle from running in under the freight vehicle in the event of a side collision. In the example depicted, the curtain extends further down to underrun bar 14, in which it is fastened. In addition to the cargo space, a large portion of the vehicle's chassis, including the rear wheels, is thus also covered and protected (see FIG. 1).

In the longitudinal member 13, the curtain hangs in a multiplicity of evenly spaced sliding or rolling devices indicated schematically at 12a, of any type known to the specialist, which are fastened in the curtain. These enable the curtain's upper edge 12' to be moved (forwards in the embodiment depicted) along the member 13 from the closed and covering state depicted in FIG. 1 to an open state depicted in FIG. 2, by means of a succession of accordion folds.

Along its lower or bottom edge 12", the curtain 12 is fastened to an engaging device in 15 which may take the form of an elongate elongated rod 15 (FIG. 4) which is preferable circular in cross-section. This rod is preferably made of relatively rigid but flexible (i.e., resilient) material of any suitable type as will be apparent to and understood by one skilled in the art. The connection between the curtain and the rod may be made in any suitable manner which allows uniform transmission to the curtain of tensioning forces directed perpendicular to the rod, which in this case means downwards. For example, the bottom of the curtain may be folded upwardly to form a loop or channel 16 which extends along substantially the whole length of the curtain and surrounds the engaging device 15, as illustrated in FIGS. 4–6.

Figure 3:
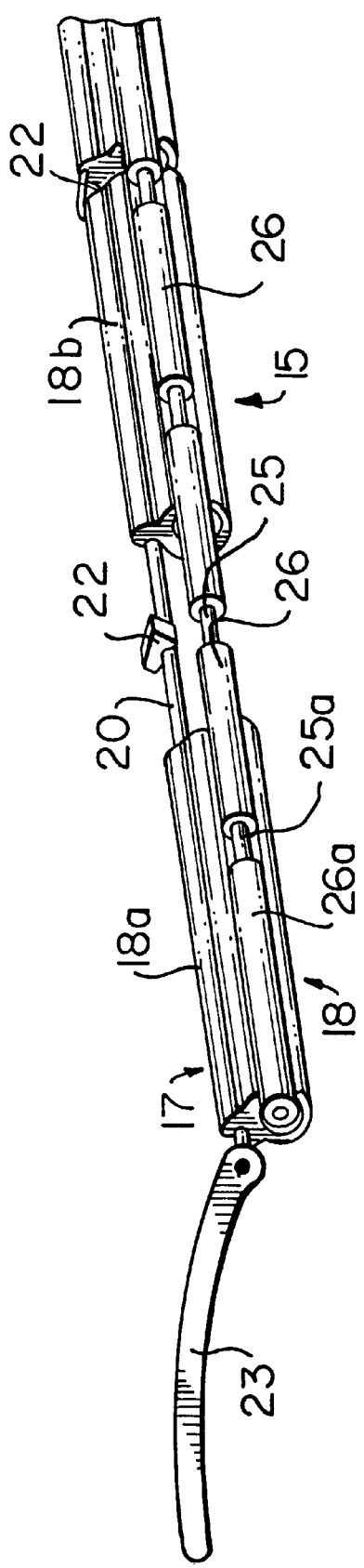
FIGS. 3 and 3a–3d depict in perspective part of the tensioning device and operation of the folding mechanism.
Figure 3A:
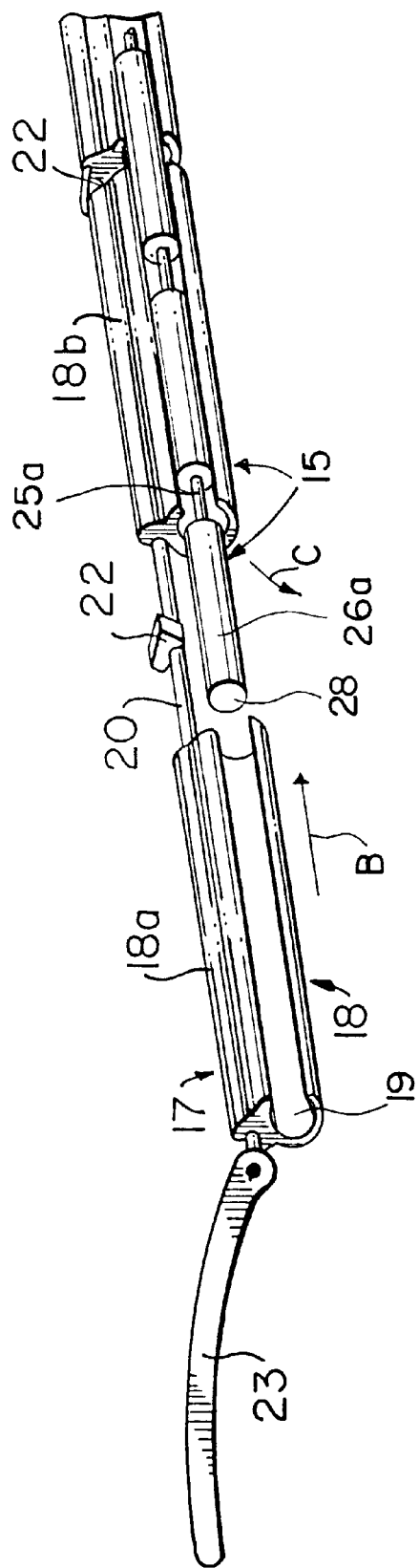
Figure 3B:
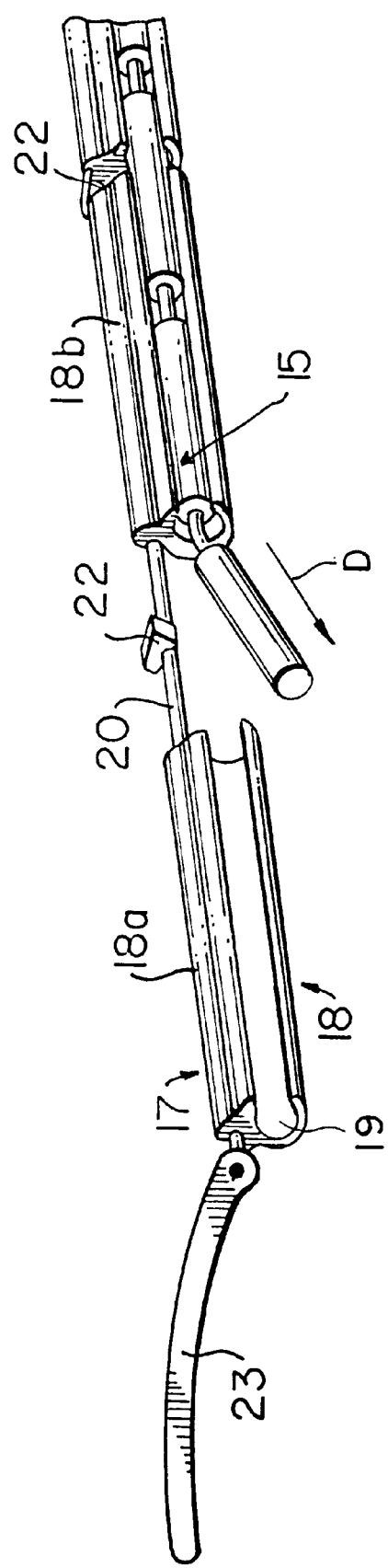
Figure 3C:
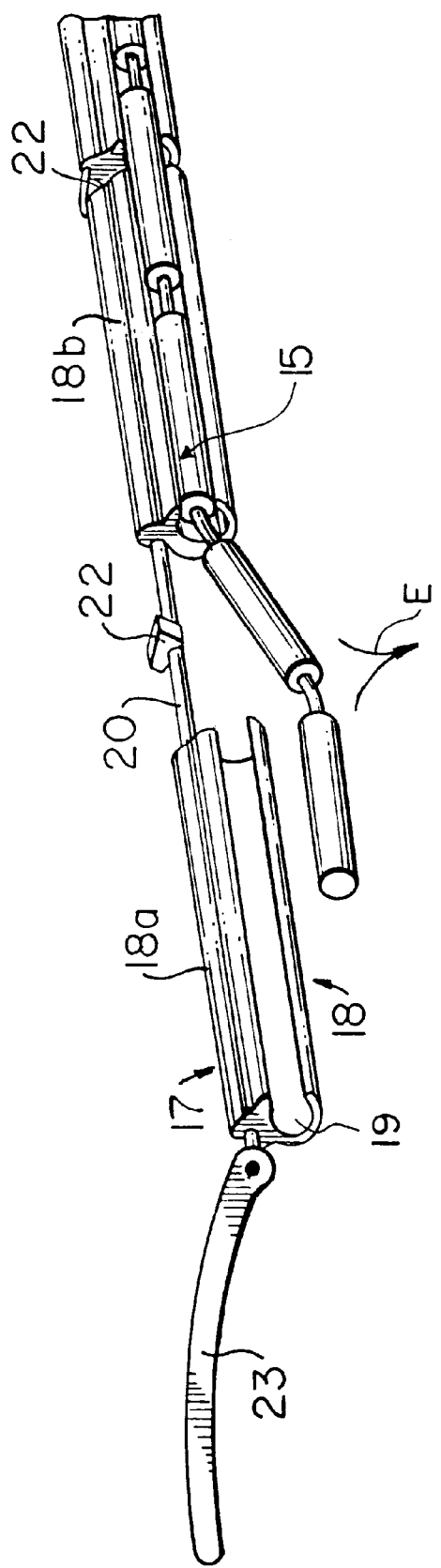
Figure 3D:
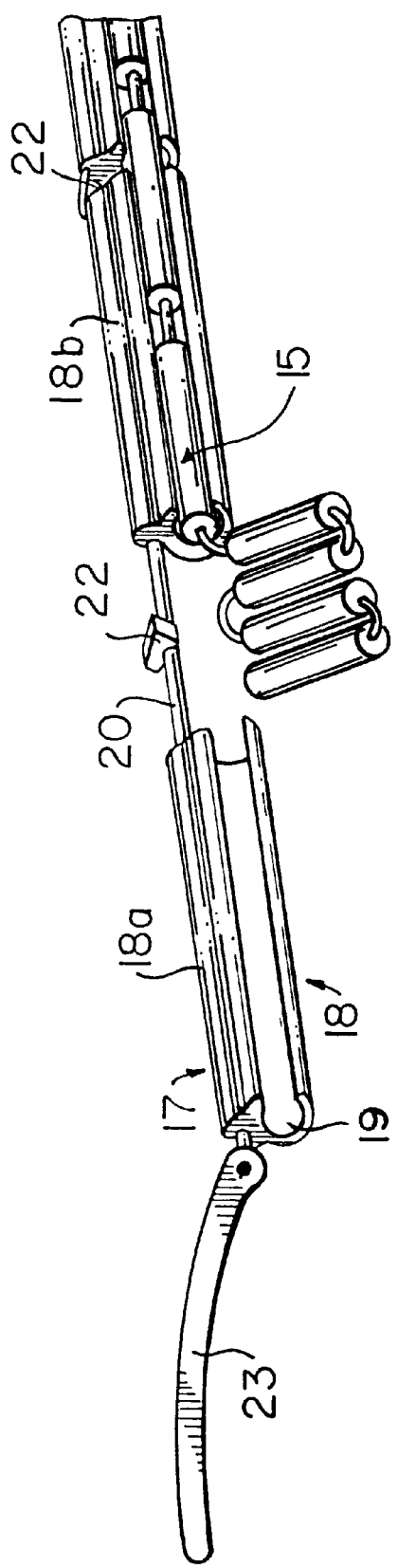
Figure 4:
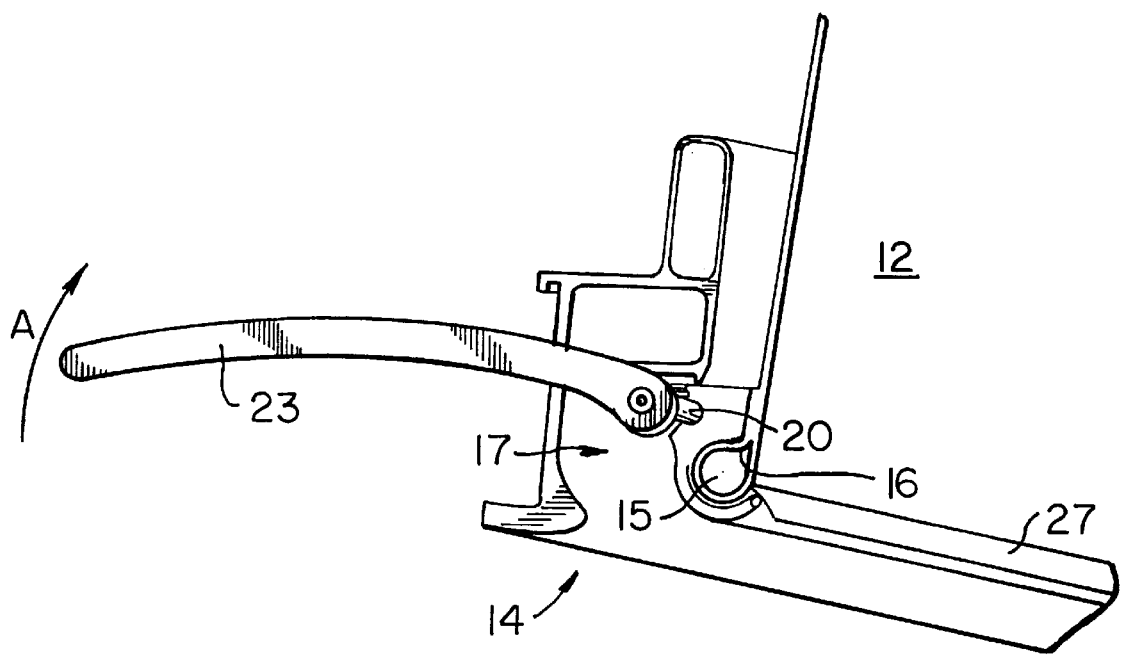
FIG. 4 depicts in perspective a detail of the tensioning device in an untensioned state.
Figure 5:
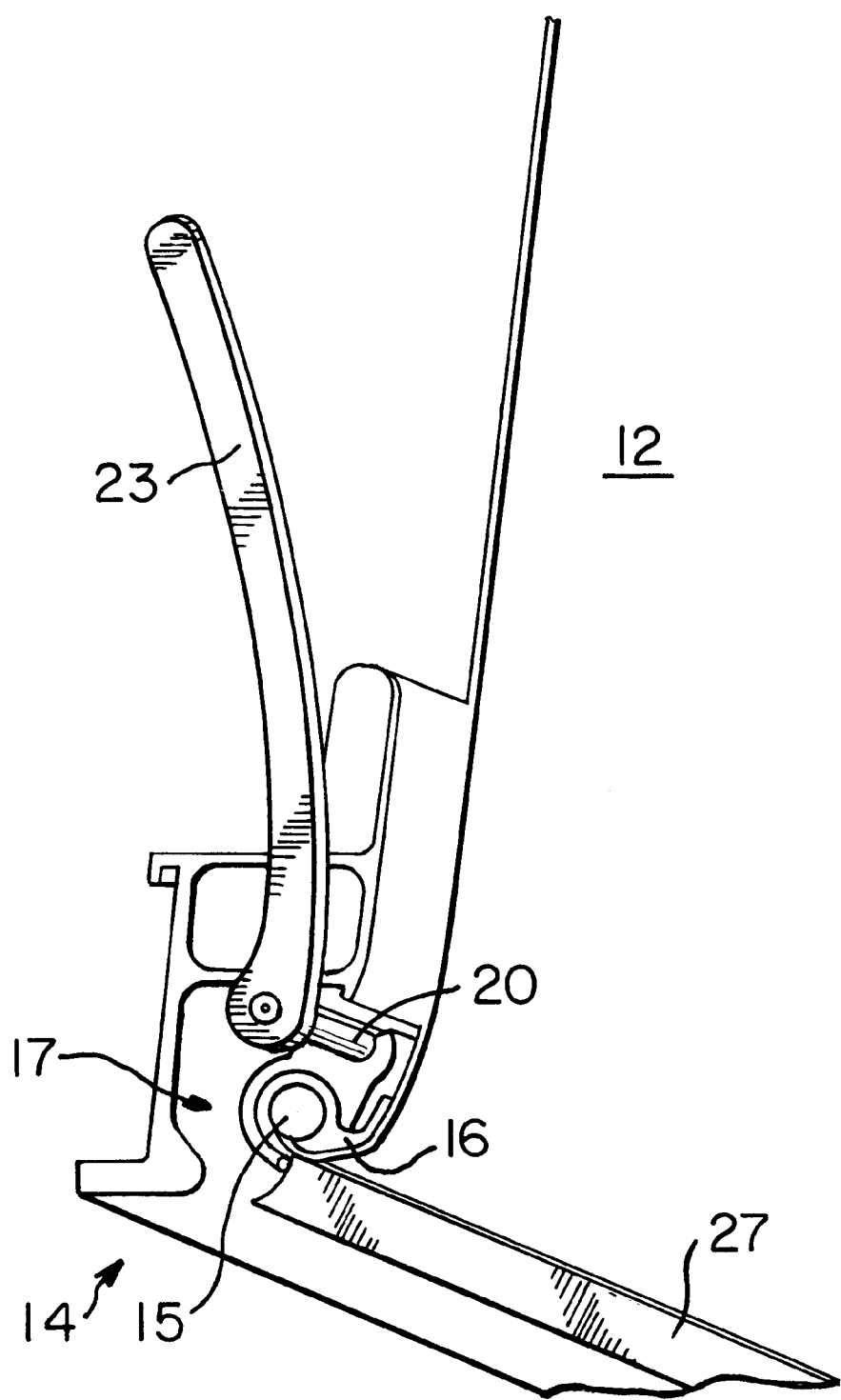
FIG. 5 depicts in perspective a detail of the tensioning device in a tensioned state.
Figure 6:
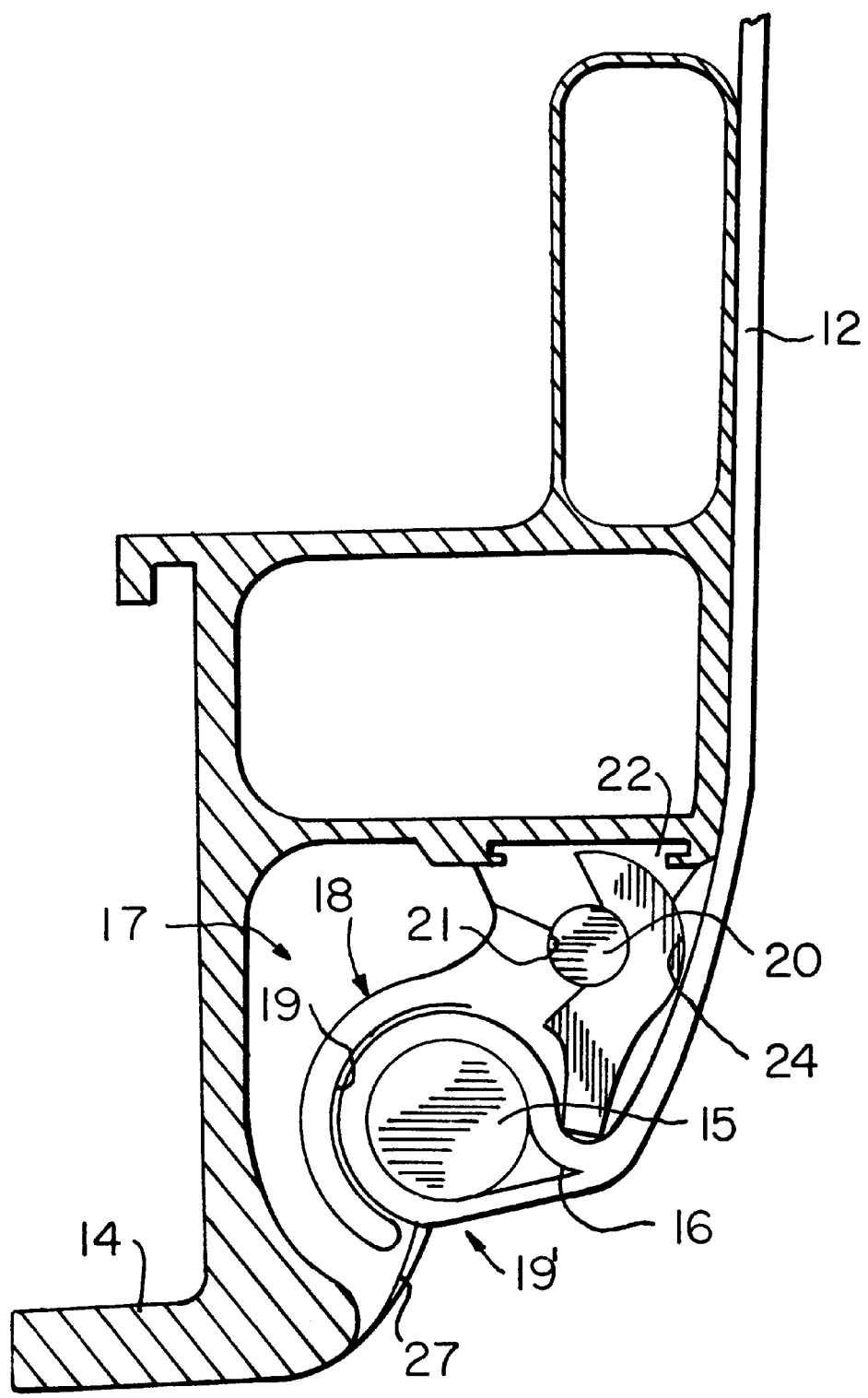
FIG. 6 depicts a cross-section through the tensioning device and a longitudinal member of the vehicle.

To fasten the lower edge 12" of the curtain to the underrun bar 14, a tensioning arrangement 17 (depicted separately in FIG. 3) is fitted in it and mounted on the underrun bar in FIGS. 4–6.

The tensioning arrangement comprises at least one metal retaining section 18, the cross-section of which is best indicted by FIG. 6. This retaining section exhibits a longitudinal groove or recess 19, the shape of which matches the external shape of the curtain channel 16 surrounding the engaging device 15. In this embodiment, the recess is thus substantially cylindrical. Its radius is so much larger than that of the channel 16 containing the engaging device 15 that the curtain's bottom edge 12" can be inserted in the recess 19 from one end of the retaining section. The recess surrounds to the extent of more than 180° the curtain channel 16 containing the engaging device 15, so that the curtain cannot be pulled out of the recess via its aperture 19'. The width of the aperture is preferably not larger than the smallest cross-section of engaging device 15.

To tension the curtain, each retaining section 18 is firmly connected to a spindle 20 which extends through a hole 21 in the retaining section which is parallel to the recess 19. A multiplicity of retaining sections arranged with intermediate spacing is preferably arranged. The spindle is supported in bearing brackets 22 (FIGS. 3 and 6) in the intermediate space between two retaining sections. The bearing brackets 22 are themselves fastened to a portion of the underrun bar 14 (FIG. 6). An operating arm 23 is fastened to one end of the spindle 20. FIGS. 3 and 4 show the operating arm in a position whereby the curtain 12 is in an untensioned state. Acting upon the operating arm 23 in a clockwise direction according to FIG. 4 (arrow A) causes rotation of the spindle 20 and hence of the retaining sections 18, resulting in the recess 19 and the bottom edge of the curtain moving downwards and inwards with tensioning of the curtain. The position of the operating arm 23 in the curtain's tensioned state is depicted in FIG. 5.

To tension the curtain as uniformly as possible, the retaining sections 18 are as long as possible, i.e. the intermediate space between them is normally not longer than is required to accommodate a bearing bracket 22.

As indicated particularly by FIG. 6, the engaging device 15 is situated relatively far from the center of rotation of the spindle 20. This means that a relatively large tensioning movement takes place at the commencement of rotation. Towards the end of the tensioning movement (FIG. 6), the retaining section assumes a position whereby the curtain 12 abuts against a cylindrically curved surface 24 about the spindle 20, resulting in less tensioning movement but greater tensioning force.

To prevent the curtain being unintentionally slackened, various forms of mechanisms obvious to the specialist for locking or blocking the operating handle or the spindle may be considered to be incorporated. They may with advantage consist of or include means for preventing unauthorised opening of the curtain, e.g. means for sealing by customs.

To allow movement of the whole curtain, the engaging device 15 is provided with a multiplicity of evenly spaced main sections 26a, 26b, 26c. . . separated by bending or folding notches 25a, 25b, 25c. In the preferred embodiment the notches take the form of cross-section reductions so dimensioned in both cross-section and length that the main sections on either side of a cross-section reduction can be bend substantially 180° about the cross-section reduction, thereby permitting curtain 12 to be accordion-folded as it is opened. The folding operation is best illustrated in FIGS. 3 and 3a–3d in which the curtain itself is omitted for clarity.

As will be apparent, to fold the curtain, it has to be pulled out of the recess 19 in tensioning device 17. This can of course be done at one end of the curtain, but it is preferred that it takes place via a relatively large space between two retaining sections 18a and 18b near to one end, here the forward end. The spacing between these retaining sections is so great that the bottom edge of the curtain can here be pulled out of the recess 19. This is achieved by the bottom edge being first pushed rearwards as indicated at B in FIG. 3a through the forwardmost section 18a until the forward end 28 of the forward main section 26a of engaging device 15 becomes free to be folded out in the intermediate space between sections 18a and 18b (as indicated by C in FIG. 3a). Thereafter the whole bottom edge of the curtain can be pulled out of the second retaining section 18b (and subsequent retaining sections) via the intermediate space between sections 18a and 18b, as indicated at D in FIG. 3b. At the same time, the top edge of the curtain also moves as described above and the curtain endeavours to fold itself between said sliding or rolling devices. This folding will be guided by the fact that reduced cross-section notches 25a, 25b, 25c. . . serve as bending notches or hinges about which the folding takes place as illustrated at E in FIG. 3c. The folded curtain moved to an open position is depicted particularly in FIGS. 2 and 3d.

To allow the opening process described, the distance between the two forwardmost retaining sections 18a and 18b has in practice to be at least as great as the distance between the forward end 28 of the front main section and adjacent notch 25a. The distance may of course be made shorter if the material adopted for engaging device 15 is so flexible that the rod can be bent sufficiently despite notch 25a not being forward of the recess 19 of the second retaining section 18b.

An intermediate space similar to that between retaining sections 18a and 18b may also with advantage be arranged near to the rear end of the curtain to make it possible for the curtain to be opened rearwards, so as to render a rear portion of the cargo space accessible. It is of course also possible for similar intermediate spaces to be arranged at other points along the curtain, e.g. at its middle, so that simultaneous opening of the forward and rear portions of the cargo space becomes possible. It is understood in that case that a looped portion of the bottom edge of the curtain is pulled out via said intermediate space.

As alternatives to the preferred embodiment described, it is possible to conceive other versions with corresponding functions. One such alternative would be to use a spring between separate main sections 26a, 26b, 26c . . . .

To prevent dirt, water, snow etc. entering the space between the retaining section 18 and the underrun bar 14 and possibly thereby affecting the functioning of the bearing brackets when the curtain is in a closed and tensioned state, i.e. the state in which the vehicle normally travels, the portion of the retaining section furthest away from the spindle 20 is provided with a seal strop 27 (FIGS. 4, 5 and 6) running along all the retaining sections. As indicated by FIGS. 5 and 6, when the curtain is in a tensioned state, this strip comes to bear upon a lower portion of the underrun bar 14.

What is claimed is:

1. A freight vehicle which includes:
   a superstructure having an upper portion and a lower portion, and a cargo space within the superstructure;
   a curtain for a longitudinal side of the freight vehicle, the side curtain having an upper edge movably supported at the upper portion of the superstructure in a manner permitting movement of the upper edge of the curtain longitudinally along the upper portion of the superstructure for opening and closing the curtain over the side of the vehicle;
   the curtain further including a relatively rigid engaging device at a bottom edge thereof and extending along substantially the entire length of the curtain in the longitudinal direction of the vehicle, the engaging device having a plurality of bending regions spaced apart in the longitudinal direction at which the engaging device may be bent to permit folding of the curtain during movement of the curtain toward a position not covering the side of the vehicle; and
   a curtain tensioning device extending longitudinally along the lower portion of the superstructure, the curtain being releasably secured to the engaging device at a plurality of fastening points, the tensioning device and the engaging device being operable for selectively either tensioning the curtain between the upper and lower edges of the curtain or releasing the tensioning thereof.

2. The vehicle of claim 1, wherein:
   the curtain is at least partially separable from the tensioning device for enabling bending of the engaging device at the bending regions, and
   the tensioning arrangement is so shaped that at least one of the bending regions may be moved from the tensioning device during folding of the curtain.

3. The vehicle of claim 1, wherein the engaging device is an elongated element extending longitudinally along the superstructure.

4. The vehicle of claim 3, wherein the bending regions comprise bending notches in the elongated element.

5. The vehicle of claim 4, wherein the bending notches are evenly spaced along the elongated element.

6. The vehicle of claim 5, wherein the elongated element has a main cross-section and a reduced cross-section at the bending notches relative to the main cross-section.

7. The vehicle of claim 6, wherein the elongated element is a circular cylinder.

8. The vehicle of claim 3, wherein the elongated element is circular cylinder.

9. The vehicle of claim 3, wherein the bottom edge of the curtain is shaped to form a channel and the elongated element extends through the channel at the bottom edge of the curtain.

10. The vehicle of claim 9, wherein the tensioning device includes an elongated section having a recess therein running along the longitudinal direction of the elongated section, the recess being open laterally at an aperture thereof;
    the engaging device elongated element and the recess in the elongated section of the tensioning device having generally matching cross-sections, with the width of the aperture of the recess in the tensioning device being smaller than the cross-section of the elongated element of the engaging device.

11. The vehicle of claim 3, wherein the tensioning device includes an a first elongated section having a recess therein running along the longitudinal direction of the elongate section, the recess being open laterally at an aperture thereof;
    the engaging device elongated element and the recess in the first elongated section of the tensioning device having generally matching cross-sections, with the width of the aperture of the recess in the tensioning device being smaller than the cross-section of the elongate element of the engaging device.

12. The vehicle of claim 11, wherein:
    the tensioning device includes a second elongated section adjacent to the first elongated section and a support element for supporting the adjacent elongated sections a first distance apart;
    the elongated element of the engaging device has a main cross-section and a cross-section at the bending notches which is reduced locally with respect to the main cross-section;
    the engaging device elongated element including an outer portion at one end thereof having the main cross-section followed by a locally reduced cross-section; and
    the distance between the first and second elongated sections of the tensioning device is at least as great as the length of the outer portion of the engaging device elongated element.

13. The vehicle of claim 11, further comprising a rotatable spindle fastened to the vehicle to which each of the elongated sections of the tensioning device is firmly connected to rotate with the spindle.

14. The vehicle of claim 13, wherein the vehicle has an underrun bar at the bottom of the superstructure, the spindle being at the bottom of the superstructure.

15. A side curtain for a longitudinal side of a freight vehicle, the freight vehicle including a superstructure having an upper portion and a lower portion, and a cargo space within the superstructure, the side curtain being comprised of:
    an upper edge for movable attachment at the upper portion of the superstructure in a manner permitting movement of the upper edge of the curtain longitudinally along the upper portion of the superstructure for opening and closing the curtain over the side of the vehicle;
    a bottom edge;
    a relatively rigid engaging device at the bottom edge extending along substantially the entire length of the curtain in the longitudinal direction of the vehicle when the curtain is installed thereon, the engaging device having a plurality of bending regions spaced apart in the longitudinal direction at which the engaging device may be bent to permit folding of the curtain during movement of the curtain toward a position not covering the side of the vehicle; and
    a curtain tensioning device for attachment longitudinally along the lower portion of the superstructure, the curtain being releasably secured to the tensioning device at a plurality of fastening points when the curtain and the tensioning device are installed on the vehicle, the tensioning device and the engaging device being operable for selectively either tensioning the curtain between the upper and lower edges of the curtain or releasing the tensioning thereof.

16. The vehicle side curtain of claim 15, wherein the bottom of the curtain is at least partially separable from the tensioning device when the curtain is installed on the vehicle for enabling bending of the engaging device at the bending regions, the tensioning device being so shaped that the bending regions of the engaging device may be moved from the tensioning device during folding of the curtain.

17. The vehicle side curtain of claim 15, wherein the engaging device is an elongated element extending longitudinally along the superstructure when the curtain is installed on a vehicle.

18. The vehicle side curtain of claim 17, wherein the bending regions comprise bending notches in the elongated element.

19. The vehicle side curtain of claim 18, wherein the bending notches are evenly spaced along the elongated element.

20. The vehicle side curtain of claim 19, wherein the elongate element has generally a main cross-section and a reduced cross-section at the bending notches relative to the main cross-section.

21. The vehicle side curtain of claim 20, wherein the elongated element is circular cylinder.

22. The vehicle side curtain of claim 15, wherein the elongated element is circular cylinder.

23. The vehicle side curtain of claim 17, wherein the bottom edge of the curtain is shaped to form a channel and the elongated element extends through the channel at the bottom edge of the curtain.

24. The vehicle side curtain of claim 23, wherein the tensioning device includes an elongated section having a recess therein running along the longitudinal direction of the elongated section, the recess being open laterally at an aperture thereof, the engaging device elongated element and the recess in the elongated section having generally matching cross-sections, with the width of the aperture of the recess in the tensioning device being smaller than the cross-section of the elongated element of the engaging device.

25. The vehicle side curtain of claim 17, wherein the tensioning device includes a first elongated section having a recess therein running along the longitudinal direction of the elongate section, the recess being open laterally at an aperture thereof;

the engaging device elongated element and the recess in the first elongated section of the tensioning device having generally matching cross-sections, with the width of the aperture of the recess being smaller than the cross-section of the elongate element.

26. The vehicle side curtain of claim 25, wherein the tensioning device includes a second elongated section adjacent to the first elongated section and a support element for supporting the adjacent elongated sections a first distance apart when the curtain is installed on a vehicle;

the elongated element of the engaging device has a main cross-section and a cross-section at the bending notches which is reduced locally with respect to the main cross-section;

the engaging device elongated element including an outer portion at one end thereof having the main cross-section followed by a locally reduced cross-section; and the distance between the first and second elongated sections of the tensioning device is at least as great as the length of the outer portion of the engaging device of the elongated element.

27. The vehicle side curtain of claim 25, further comprising a rotatable spindle to which each of the elongated sections of the tensioning device is firmly connected to rotate with the spindle.

28. The vehicle side curtain of claim 27, wherein the spindle is located adjacent to an underrun bar at the bottom of the superstructure when the curtain is installed on a vehicle.

* * * * *